US005597517A

United States Patent [19]

Chopdekar et al.

[11] Patent Number: 5,597,517
[45] Date of Patent: Jan. 28, 1997

[54] TWO-COMPONENT CHEMILUMINESCENT COMPOSITION

[75] Inventors: Vilas M. Chopdekar, Edison; James R. Schleck, Somerset; Cheng Guo, Harrison; Amanda J. Hall, Raritan, all of N.J.

[73] Assignee: Jame Fine Chemicals, Inc., Bound Brook, N.J.

[21] Appl. No.: 640,069

[22] Filed: Apr. 30, 1996

[51] Int. Cl.$^6$ ........................................ C09K 3/00
[52] U.S. Cl. ........................................ 252/700
[58] Field of Search ........................ 252/700; 362/34

[56] References Cited

U.S. PATENT DOCUMENTS

| | | | |
|---|---|---|---|
| 3,729,426 | 4/1973 | Zweig et al. | 252/700 |
| 3,749,679 | 7/1973 | Rauhut | 252/700 |
| 3,775,336 | 11/1973 | Bollyky | 252/700 |
| 3,816,326 | 6/1974 | Bollyky | 252/700 |
| 3,948,797 | 4/1976 | Vega | 252/700 |
| 4,017,415 | 4/1977 | Doering | 252/700 |
| 4,626,383 | 12/1986 | Richter et al. | 252/700 |
| 4,751,616 | 6/1988 | Smithey | 252/700 |
| 5,281,367 | 1/1994 | Schleck et al. | 252/700 |

*Primary Examiner*—Philip Tucker
*Attorney, Agent, or Firm*—Jack Matalon

[57] ABSTRACT

A chemiluminescent composition comprising an oxalate component comprising an oxalate ester and a solvent, an activator component comprising a peroxide compound and a catalyst and a fluorescer contained in the oxalate component and/or the activator component. The solvent contained in the oxalate component comprises a propylene glycol dihydrocarbyl ether containing one to three propylene moieties and each hydrocarbyl moiety contains up to 8 carbon atoms and is independently selected from the group consisting of straight chain alkyl, branched chain alkyl, cycloalkyl, aryl, alkaryl and aralkyl groups.

18 Claims, No Drawings

# TWO-COMPONENT CHEMILUMINESCENT COMPOSITION

FIELD OF THE INVENTION

The invention relates to a solvent for a two-component chemiluminescent composition which, upon admixture of the two components, instantly produces high intensity chemiluminescent light of long duration.

BACKGROUND OF THE INVENTION

Chemiluminescent compositions which produce light upon admixture of two components are well known. The two components are kept separate until light is desired. At the desired time, the two components are mixed and light is produced. The intensity, duration and color of the light will depend on the ingredients of the two components.

The first component is an oxalate component which comprises an oxalate ester. The second component is an activator component which comprises a peroxide compound and a catalyst. The composition also includes a fluorescer which may be present in either component.

The chemiluminescent composition also must include a solvent. Typical prior art compositions require the presence of a solvent for the oxalate component and a solvent or mixture of solvents for the activator component. The solvents for the two components may be different but should be miscible.

The solvent selected for the oxalate component must solubilize the selected oxalate component and the solvent or mixture of solvents for the activator component must solubilize the selected peroxide and the selected catalyst. If the fluorescer is present in the oxalate component, the solvent selected for the oxalate component must solubilize the selected fluorescer as well as the selected oxalate compound. If the fluorescer is present in the activator component, the solvent must solubilize the selected fluorescer, the selected peroxide compound and the selected catalyst.

Typical solvents disclosed in the prior art for the oxalate component include esters such as ethyl acetate, ethyl benzoate, butyl benzoate, dimethyl phthalate, dibutyl phthalate, dioctyl phthalate, methyl formate, triacetin, diethyl oxalate, and dioctyl terphthalate; aromatic hydrocarbons such as benzene, toluene, ethylbenzene and butylbenzene; chlorinated hydrocarbons such as chlorobenzene, o-dichlorobenzene, m-dichlorobenzene, chloroform, carbon tetrachloride, hexachloroethane and tetrachlorotetrafluoropropane. The prior art solvents of choice for the oxalate component are dibutylphthalate (most preferred) and butyl benzoate.

Typical solvents disclosed in the prior art for the activator component include alcohols such as t-butyl alcohol, ethanol, n-octanol, 3-methyl-3-pentanol and 3,6-dimethyloctanol-3; esters such as ethyl acetate, ethyl benzoate, dimethylphthalate, dibutylphthalate and propyl formate; ethers such as diethyl ether, diamyl ether, tetrahydrofuran, dioxane, diethylene glycol monobutyl ether, perfluoropropyl ether and 1,2-dimethoxyethane. The prior art solvent of choice for the activator component is a mixture of dimethylphthalate or dibutylphthalate and t-butyl alcohol.

U.S. Patent 3,816,326 to Bollyky discloses a number of types of organic solvents for the oxalate component, e.g.

a. Ethers and polyethers such as diethylene glycol diethyl ether, diethylene glycol dimethyl ether, ethylene glycol dimethyl ethers;

b. Esters such as ethyl acetate, ethyl benzoate, dimethyl phthalate, dibutyl phthalate, dioctyl phthalate, methyl formate, triacetin, diethyl oxalate and dioctyl terphthalate;

c. Aromatic hydrocarbons such as benzene, toluene, ethylbenzene and butylbenzene;

d. Chlorinated hydrocarbons such as chlorobenzene, o-dichlorobenzene, m-dichlorobenzene, chloroform, carbon tetrachloride, hexachloroethane and tetrachlorotetrafluoropropane. Of the above solvents, Bollyky prefers diethylene glycol diethyl ether, ethyl benzoate, dibutyl phthalate and dimethyl phthalate.

SUMMARY OF THE INVENTION

It has now been found that the prior art solvents employed for solvating the oxalate component of two-component chemiluminescent compositions are deficient in several respects. This is quite surprising since patents covering chemiluminescent compositions including the solvents therefor were filed over 20 years ago and the list of useful solvents is quite extensive.

In particular, it has now been found that the solvents of the invention have a significantly greater solvating capacity for solvating the oxalate component than that of any of the prior art solvents. This means that the overall volume of the two-component chemiluminescent compositions of the present invention can be significantly reduced and higher level of glow for a longer period of time can be attained together with significant cost reductions.

It has also been found that the light glow produced from the two-component chemiluminescent compositions of the present invention lasts substantially longer than prior art compositions which do not utilize the instant propylene glycol dihydrocarbyl ether solvents. Additionally, the instant propylene glycol dihydrocarbyl ether solvents are biodegradable and are non-toxic to marine life. The latter is a very important advantage since large quantities of chemiluminescent devices are used each year by deep sea commercial fisherman as fish attractants.

It is also surprising that prior art solvents related to the propylene glycol dihydrocarbyl ether solvents of the present invention produce very poor or no glow. In particular, it has been found that the well known prior art ethers of the family of CELLOSOLVE®, CARBITOL® and PROPASOL® glycol ethers are quite poor in comparison to the propylene glycol dihydrocarbyl ethers of the present invention. Such prior art ethers are characterized by having both an ether linkage (C—O—C) and an alcohol linkage (C—O—H) in the same molecule. In contrast thereto, the propylene glycol dihydrocarbyl ether solvents of the present invention contain only ether linkages in the molecule.

It has been found that two-component chemiluminescent compositions utilizing propylene glycol dihydrocarbyl ethers for solvating the oxalate component provided clearly superior results as compared to the ethylene glycol dihydrocarbyl ethers disclosed in the Bollyky patent as useful solvents for solvating the oxalate component. This result is quite surprising since the propylene and ethylene moieties are adjacent homologues and it was to be expected that there would have been no significant difference in solvation characteristics between the propylene glycol dihydrocarbyl ethers employed in the instant invention and the ethylene glycol dihydrocarbyl ethers disclosed in the Bollyky patent.

DETAILS OF THE INVENTION

The invention encompasses chemiluminescent compositions comprising an oxalate component, an activator component, a fluorescer contained in the oxalate and/or activator component and a propylene glycol dihydrocarbyl ether solvent contained in the oxalate component.

The invention relates to a chemiluminescent composition comprising:

a) an oxalate component comprising an oxalate ester;

b) an activator component comprising a peroxide compound, a catalyst and preferably a solvent;

c) a fluorescer contained in the oxalate component or in the activator component or in both the oxalate and the activator components; and d) a propylene glycol dihydrocarbyl ether solvent contained in the oxalate component.

The solvent for the oxalate component comprises a propylene glycol dihydrocarbyl ether containing 1 to 3 propylene (normal or iso) moieties and each hydrocarbyl moiety contains up to 8 carbon atoms and is independently selected from the group consisting of straight chain alkyl, branched chain alkyl, cycloalkyl, aryl, alkaryl and aralkyl. Such solvents are commercially available and their syntheses are reported in the literature.

Preferably, the propylene glycol dihydrocarbyl ether contains two propylene moieties and the hydrocarbon moieties are the same or different $C_1$–$C_4$ straight or branched chain alkyl groups, i.e. methyl, ethyl, propyl, isopropyl, butyl, isobutyl, sec.-butyl and tert.-butyl. Suitable examples of preferred solvents for the oxalate component include dipropylene glycol dimethyl ether, dipropylene glycol diethyl ether and dipropylene glycol di-tert.-butyl ether. The solvent is present in the oxalate component in an amount of about 74 to 99 wt. %, based on the weight of the oxalate component, i.e. weight of the selected oxalate ester plus solvent. On a molar basis, the concentration of the selected oxalate ester in the selected propylene glycol dihydrocarbyl ether solvent will preferably be in the range of about 0.005 to 1.0M.

THE OXALATE COMPONENT

The oxalate component comprises the selected oxalate ester present as a solution in the selected propylene glycol dihydrocarbyl ether solvent. The oxalate esters employed in the oxalate component are well known in the prior art, e.g. see U.S. Pat. Nos. 3,597,362 and 3,749,679. Examples of suitable oxalate esters include bis(2,4,5-trichloro-6-carbopentoxyphenyl)oxalate, bis(2,4,5-trichlorophenyl)oxalate, bis(2,4,5-tribromo-6-carbohexoxyphenyl)oxalate, bis(2-nitrophenyl)oxalate, bis(2,4-dinitrophenyl)oxalate, bis(2,6-dichloro-4-nitrophenyl) oxalate, bis(2,4,6-trichlorophenyl)oxalate, bis(3-tri-fluoromethyl-4-nitrophenyl)oxalate, bis(2-methyl-4,6dinitrophenyl)oxalate, bis(1,2-dimethyl-4,6-dinitrophenyl)oxalate, bis(2,4-dichlorophenyl)oxalate, bis(2,4-dinitrophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methylphenyl)oxalate and bis-N-phthalimidyl oxalate. Preferably, the oxalate ester comprises bis(2,4,5-trichloro-6-carbopentoxyphenyl) oxalate (commonly referred to as "CPPO") or bis(2,4,5-trichlorophenyl)oxalate (commonly referred to as "TCPO").

THE ACTIVATOR COMPONENT

The activator component comprises the selected peroxide compound and the selected catalyst as is, but preferably as a solution in the selected solvent. Typically, the ratio by volume of the oxalate component to the activator component will be in the range of about 1:6 to 6:1.

Suitable solvents for the activator component include the same solvents indicated above for the oxalate component, i.e. a propylene glycol dihydrocarbyl ether containing 1 to 3 propylene (normal or iso) moieties and each hydrocarbyl moiety contains up to 8 carbon atoms and is independently selected from the group consisting of straight chain alkyl, branched chain alkyl, cycloalkyl, aryl, alkaryl and aralkyl, e.g. dipropylene glycol dimethyl ether, dipropylene glycol diethyl ether and dipropylene glycol di-tert.-butyl ether. Other useful solvents for the activator component include alcohols such as t-butyl alcohol, ethanol, n-octanol, 3-methyl-3-pentanol and 3,6-dimethyloctanol-3; esters such as ethyl acetate, ethyl benzoate, dimethylphthalate, dibutylphthalate and propyl formate; ethers such as diethyl ether, diamyl ether, tetrahydrofuran, dioxane, diethylene glycol monobutyl ether, perfluoropropyl ether and 1,2-dimethoxyethane. The solvent of choice for the activator component is a mixture of dimethylphthalate or dibutylphthalate and t-butyl alcohol. Typically, the molar concentration of the selected peroxide compound in the solvent will be in the range of about 0.005 to 3.0M.

THE PEROXIDE COMPOUND

Suitable peroxide compounds include hydrogen peroxide, sodium peroxide, sodium perborate, sodium pyrophosphate peroxide, urea peroxide, histidine peroxide, t-butylhydroperoxide and peroxybenzoic acid. The preferred peroxide compound comprises hydrogen peroxide.

THE CATALYST

Catalysts for the chemiluminescent composition are well known in the prior art, e.g. U.S. Pat. Nos. 3,775,336; 3,749,679; 4,751,616; 4,626,383; 5,281,367. The concentration of the catalyst in the activator component is typically in the range of about $1\times10^{-6}$ to $1\times10^{-1}$M. Suitable catalysts include sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-5-chlorosalicylate, lithium-3-chlorosalicylate, lithium-3,5-dichlorosalicylate, lithium-3,5,6-trichloro-salicylate, lithium-2-chlorobenzoate, lithium-5-t-butyl-salicylate, lithium trifluoroacetate, rubidium acetate, tetrabutylammonium salicylate, tetrabutylammonium tetrafluoborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butylsalicylate, magnesium-3-chlorosalicylate, magnesium-3,5-dichlorosalicylate and magnesium-3,5,6-trichlorosalicylate. Preferably, the catalyst comprises sodium-5-chlorosalicylate or lithium-5-chlorosalicylate.

THE FLUORESCER

The selected fluorescer is typically a compound which has a spectral emission in the range of 330 to 1,000 mµ and is one which will be soluble in the selected solvent. The fluorescer may be present in the oxalate component, the activator component or in both components and is typically present in a concentration of about 0.001 to 0.03M.

Suitable fluorescers include those described in U.S. Pat. Nos. 3,729,426, 3,948,797, 4,017,415 and 5,122,306 such as 2-ethyl-9,10-bis(phenylethynyl)anthracene, 2-chloro-9,10- bis(4-ethoxyphenyl)anthracene, 2-chloro-9,10-bis(4-ethoxyphenyl)anthracene, 9,10-bis(phenylethynyl)anthracene, 9,10-bis(4-methoxyphenyl)-2-chloroanthracene, 1-chloro-9,10-bis(phenylethynyl)anthracene, 1,8-dichloro-9,10-bis(phenylethynyl)anthracene, 1,5-di-chloro-9,10-bis(phenylethynyl)anthracene, 2,3-dichloro-9,10-bis(phenylethynyl) anthracene, 5,12-bis(phenylethynyl)tetracene, 9,10-diphenylanthracene, perylene, 1,6,7,12-tetraphenoxy-N,N'-bis(2,6-diisopropylphenyl)-3,4,9,10-perylene dicarboximide, 1,6,7,12-tetraphenoxy-N,N'-bis(2,5-di-t-butylphenyl)-3,4,9,10-perylene dicarboximide, 1,7-dichloro-6,12-diphenoxy-N,N'-bis(2,6-diisopropylphenyl)-3,4,9,10-perylene dicarboximide, 1,6,7,12-tetra(p-bromo-phenoxy)-N,N'-bis(2,6-diisopropylphenyl)-3,4,9,10-perylene dicarboximide, 1,6,7,12-tetraphenoxy-N,N'-dineopentyl-3,4,9,10-perylene dicarboximide, 1,6,7,12-tetra(p-t-butylphenoxy)-N,N'-dineopentyl-3,4,9,10-perylene dicarboximide, 1,6,7,12-tetra(o-chlorophenoxy)-N,N'-bis(2,6-diisopropylphenyl)-3,4,9,10-perylene dicarboximide, 1,6,7,12-tetra (p-chlorophenoxy)-N,N'-bis(2,6-diisopropylphenyl)-3,4,9,10-perylene dicarboximide, 1,6,7,12-tetra (o-fluorophenoxy)-N,N'-bis(2,6-diisopropylphenyl)-3,4,9,10-perylene dicarboximide, 1,6,7,12-tetra (p-fluorophenoxy)-N,N'-bis(2,6-diisopropylphenyl)-3,4,9,10-perylene dicarboximide, 1,6,7,12-tetraphenoxy-N,N'-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone, rubrene, 2-ethyl-9,10-bis(phenylethynyl) anthracene and 1,4-dimethyl-9,10-bis(phenylethynyl) anthracene. Preferably, the fl uorescer comprises 2-ethyl-9,10-bis(phenylethynyl) anthracene or 2-chloro-9,10-bis(4-ethoxyphenyl)anthracene.

The following examples serve to illustrate the invention and are not intended to limit the scope of the invention except as limited by the appended claims.

EXAMPLE 1

Various chemiluminescent compositions were prepared using the following general procedure: A 500 ml 3-neck flask was fitted with a stirrer, thermometer and $N_2$ blanket. The flask was purged with Na gas and thereafter 20 g bis(2,4,5-trichloro-6-carbopentoxyphenyl)oxalate ("CPPO"), 180 g dipropylene glycol dimethyl ether were charged to the flask. It was noted that the CPPO readily went into solution at a temperature of 20° C. Thereafter, 0.2 g of a green fluorescer, i.e. 2-ethyl-9,10-bis (phenylethynyl)anthracene, was added and the oxalate plus fluorescer solution was stirred for 5 minutes at 20° C.

The activator component was prepared by mixing 5 wt. % hydrogen peroxide solution (70 wt.% $H_2O_2$) with 80 wt. % dimethyl phthalate and 15 wt. % tert.-butyl alcohol and a catalyst comprising lithium-5-chlorosalicylate (present in a concentration of 0.18 g/l). 2.5 ml of this solution was mixed with 7.5 ml of oxalate plus fluorescer solution prepared as described above. The result was the instantaneous production of a beautiful green glow which gradually deteriorated in intensity from strong to weak over a period of 4 days.

EXAMPLE 2

Example 1 was repeated using 0.076 g lithium-5-chlorosalicylate in place of the 0.076 g sodium-5-chlorosalicylate for the activator component. The results were identical to those obtained in Example 1.

EXAMPLE 3

Using the same general procedure as set forth in Example 1, an oxalate plus fluorescer solution was prepared using 10 g CPPO, 90 g propylene glycol methyl-n-butyl ether and 0.11 g 2-ethyl-9,10-bis(phenylethynyl) anthracene. The ingredients were stirred for 5 minutes at 20° C. and it was noted that the oxalate immediately went into solution. This oxalate plus fluorescer solution was then mixed with the activator components prepared in Examples 1 and 2. The results were instant strong green glows comparable to those achieved in Examples 1 and 2, thus indicating that a propylene glycol dihydrocarbyl ether having only one propylene moiety is also an excellent solvent for chemiluminescent compositions.

EXAMPLE 4

Example 3 was repeated using 90 g dipropylene glycol methyl-n-butyl ether in place of the 90 g propylene glycol methyl-n-butyl ether. The results were identical to those achieved in Example 3.

EXAMPLE 5

Example 4 was repeated using 90 g tripropylene glycol methyl-n-butyl ether in place of the 90 g propylene glycol methyl-n-butyl ether. The results were identical to those achieved in Example 4, thus indicating that a propylene glycol dihydrocarbyl ether having three propylene moieties is also an excellent solvent for chemiluminescent compositions.

EXAMPLE 6

In order to compare a propylene glycol dihydrocarbyl ether as a solvent with closely related homologues, Example 1 was repeated using the following oxalate component solvents: diethylene glycol diethyl ether ("DEDE"), diethylene glycol dimethyl ether ("DEDM"), ethylene glycol dimethyl ether ("EGDM") obtained from Aldrich Chemical Co. and dipropylene glycol dimethyl ether ("J-100") obtained from Dow Chemical Co. The total light output, expressed in lux minutes, was measured from the moment the oxalate and activator components were mixed until 24 hours later and again from such moment until 96 hours later. The results of such comparative test are shown in Table I:

TABLE I

| Solvent | LIGHT OUTPUT, lux minutes | | | |
| --- | --- | --- | --- | --- |
| | DEDE | DEDM | EGDM | J-100 |
| 24 hours | 2645.2 | 3456.7 | 3134.5 | 4378.4 |
| 96 hours | 3775.6 | 3643.9 | 3278.5 | 5552.0 |

The results set forth in Table I show that dipropylene glycol dimethyl ether (J-100) is clearly superior in light output as compared to its homologues. Moreover, it was noted that in the Material Safety Data Sheet (MSDS") obtained from Dow Chemical Co., J-100 is indicated as having no discernible level of toxicity. In contradistinction thereto, the MSDS supplied by Aldrich Chemical Co. indicated that DEDE, DEDM and EGDM were toxic or harmful to animals and/or plants.

EXAMPLE 7

In order to compare a propylene glycol dihydrocarbyl ether as a solvent with an oxalate component solvent indicated to be preferred in the prior art, Example 1 was repeated using dibutyl phthalate ("DBP") and J-100. At the outset, it was noted that the oxalate compound, i.e. CPPO, was relatively insoluble in DBP at room temperature, i.e. at room temperature, the solubility of CPPO in DBP is about 10 wt. %. In contradistinction thereto, CPPO is quite soluble in J-100 at room temperature, i.e. about 26 wt. %.

The total light output, expressed in lux. minutes, was measured from the moment the oxalate and activator components were mixed until 24 hours later and again from such moment until 96 hours later. The results of such comparative test are shown in Table II:

TABLE II

| | LIGHT OUTPUT, lux minutes | |
|---|---|---|
| Solvent | DBP | J-100 |
| 24 hours | 4689.5 | 4470.8 |
| 96 hours | 4761.5 | 6486.8 |

The results in Table II show that although DBP and J-100 produced approximately the same level of total light output within the initial 24 hours, J-100 produced a significantly higher total light output over a 96 hour period. Moreover, J-100 can be used to prepare the oxalate component at room temperature, which is a decided advantage in process efficiency and cost.

What is claimed is:

1. A chemiluminescent composition comprising:

a) an oxalate component comprising an oxalate ester and a solvent, wherein the solvent comprises a propylene glycol dihydrocarbyl ether containing one to three propylene moieties and each hydrocarbyl moiety contains up to 8 carbon atoms and is independently selected from the group consisting of straight chain alkyl and branched chain alkyl groups;

b) an activator component comprising a peroxide compound and a catalyst; and c) a fluorescer contained in the oxalate component, activator component, or in both the oxalate component and the activator component.

2. The composition of claim 1 wherein each hydrocarbyl moiety is independently selected from the group consisting of $C_1$–$C_4$ straight chain and branched chain alkyl groups.

3. The composition of claim 1 wherein the solvent contains two propylene moieties.

4. The composition of claim 3 wherein the solvent comprises dipropylene glycol dimethyl ether.

5. The composition of claim 1 wherein the solvent is present in a total amount of about 74 to 99 wt. %, based on the weight of the oxalate component.

6. The composition of claim 1 wherein the oxalate ester is selected from the group consisting of bis(2,4,5-trichloro-6-carbopentoxyphenyl)oxalate, bis(2,4,5-trichlorophenyl)oxalate, bis(2,4,5-tribromo-6-carbohexoxyphenyl)oxalate, bis(2-nitrophenyl)oxalate, bis(2,4-dinitrophenyl)oxalate, bis(2,6-dichloro-4-nitrophenyl) oxalate, bis(2,4,6-trichlorophenyl)oxalate, bis(3-tri-fluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,4-dinitrophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methylphenyl)oxalate and bis-N-phthalimidyl oxalate.

7. The composition of claim 6 wherein the oxalate ester comprises bis(2,4,5-trichloro-6-carbopentoxyphenyl) oxalate.

8. The composition of claim 6 wherein the oxalate ester comprises bis(2,4,5-trichlorophenyl)oxalate.

9. The composition of claim 1 wherein the peroxide compound is selected from the group consisting of hydrogen peroxide, sodium peroxide, sodium perborate, sodium pyrophosphate peroxide, urea peroxide, histidine peroxide, t-butyl-hydroperoxide and peroxybenzoic acid.

10. The composition of claim 1 wherein the peroxide compound comprises hydrogen peroxide.

11. The composition of claim 1 wherein the catalyst is selected from the group consisting of sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-3-chlorosalicylate, lithium-5-chlorosalicylate, lithium-3,5-dichlorosalicylate, lithium-3,5,6-trichlorosalicylate, lithium-2-chlorobenzoate, lithium-5-t-butylsalicylate, lithium trifluoroacetate, rubidium acetate, tetrabutylammonium salicylate, tetrabutylammonium tetrafluoborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butyl-salicylate, magnesium-3-chlorosalicylate, magnesium-3,5-dichlorosalicylate and magnesium-3,5,6-trichlorosalicylate.

12. The composition of claim 11 wherein the catalyst comprises sodium-5-chlorosalicylate.

13. The composition of claim 11 wherein the catalyst comprises lithium-5-chlorosalicylate.

14. The composition of claim 1 wherein the fluorescer is selected from the group consisting of 2-ethyl-9,10-bis(phenylethynyl)anthracene, 2-chloro-9,10-bis(4-ethoxyphenyl)anthracene, 2-chloro-9,10-bis(4-methoxyphenyl anthracene, 9,10-bis(phenylethynyl)anthracene, 1-chloro-9,10-bis(phenylethynyl)anthracene, 1,8-dichloro-9,10bis(phenylethynyl)anthracene, 1,5-dichloro-9,10-bis(phenylethynyl)anthracene, 2,3-dichloro-9,10-bis(phenylethynyl)anthracene, 5,12-bis(phenylethynyl)tetracene, 9,10-diphenylanthracene, perylene, 1,6,7,12-tetra-phenoxy-N,N'-bis(2,6-diisopropylphenyl)-3,4,9,10-perylene dicarboximide, 1,6,7,12-tetraphenoxy-N,N'-bis(2,5-di-t-butylphenyl)-3,4,9,10-perylene dicarboximide, 1,7-di-chloro-6,12-diphenoxy-N,N'-bis(2,6-diisopropylphenyl)-3,4,9,10-perylene dicarboximide, 1,6,7,12-tetra(p-bromo-phenoxy)-N,N'-bis(2,6-diisopropylphenyl)-3,4,9,10-perylene dicarboximide, 1,6,7,12-tetraphenoxy-N,N,-di-neopentyl-3,4,9,10-perylene dicarboximide, 1,6,7,12-tetra(p-t-butylphenoxy)-N,N,-dineopentyl-3,4,9,10-perylene dicarboximide, 1,6,7,12-tetra(o-chlorophenoxy)-N,N'-bis(2,6-diisopropylphenyl)-3,4,9,10-perylene dicarboximide, 1,6,7,12-tetra(p-chlorophenoxy)-N,N'-bis(2,6-diisopropylphenyl)-3,4,9,10-perylene dicarboximide, 1,6,7,12-tetra(o-fluorophenoxy)-N,N'-bis(2,6-diisopropylphenyl)-3,4,9,10-perylene dicarboximide, 1,6,7,12-tetra(p-fluorophenoxy)-N,N'-bis(2,6-diisopropylphenyl)-3,4,9,10-perylene dicarboximide, 1,6,7,12-tetraphenoxy-N,N'-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone, rubrene and 1,4-dimethyl-9,10-bis(phenylethynyl)anthracene.

15. The composition of claim 14 wherein the fluorescer comprises 2-ethyl-9,10-bis(phenylethynyl) anthracene.

16. The composition of claim 14 wherein the fluorescer comprises 2-chloro-9,10-bis(4-ethoxyphenyl)anthracene.

17. The composition of claim 1 wherein the activator component contains a solvent.

18. The composition of claim 17 wherein the solvent for the activator component comprises a mixture of dimethylphthalate or dibutylphthalate and t-butyl alcohol.

* * * * *